(12) United States Patent
Nielsen et al.

(10) Patent No.: US 6,883,774 B2
(45) Date of Patent: Apr. 26, 2005

(54) MICROELECTROMECHANICAL HIGH PRESSURE GAS MICROVALVE

(75) Inventors: Matthew C. Nielsen, Schenectady, NY (US); Laura J. Meyer, Schenectady, NY (US); Todd G. Wetzel, Niskayuna, NY (US); Stanton E. Weaver, Northville, NY (US); Jeffrey B. Fortin, Niskayuna, NY (US); Renato Guida, Wynantskill, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 198 days.

(21) Appl. No.: 10/277,028

(22) Filed: Oct. 21, 2002

(65) Prior Publication Data

US 2004/0256585 A1 Dec. 23, 2004

(51) Int. Cl.[7] ................................................ F16K 7/12
(52) U.S. Cl. .......................................... 251/11; 251/331
(58) Field of Search ............................... 251/11, 12, 14, 251/318–334

(56) References Cited

U.S. PATENT DOCUMENTS

| | | | | |
|---|---|---|---|---|
| 6,116,863 A | * | 9/2000 | Ahn et al. .................. 417/322 |
| 6,129,331 A | * | 10/2000 | Henning et al. ............... 251/11 |
| 6,131,879 A | * | 10/2000 | Kluge et al. ............ 251/129.06 |
| 6,182,941 B1 | * | 2/2001 | Scheurenbrand et al. ...................... 251/129.04 |
| 6,592,098 B1 | * | 7/2003 | Kao et al. .............. 251/129.01 |
| 6,715,733 B1 | * | 4/2004 | Wang et al. ................. 251/331 |

* cited by examiner

*Primary Examiner*—Paul J. Hirsch
(74) *Attorney, Agent, or Firm*—Scully, Scott, Murphy & Presser

(57) ABSTRACT

A microvalve and a method of forming a microvalve. The microvalve comprises first and second layers, a diaphragm member and a switching means. The first and second layers are secured together to form a valve body that forms an inlet opening for receiving fluid, an outlet opening for conducting fluid from the valve body, and a flow channel for conducting fluid from the inlet to the outlet. The diaphragm is disposed between the layers, and is movable between open and closed positions. In these position, the diaphragm, respectively, allows and blocks the flow of fluid from the inlet to the flow channel. The diaphragm is biased to the closed position, and moves from the closed position to the open position when the pressure of fluid in the inlet reaches a preset value. The switching means is connected to the valve body for moving the diaphragm to the closed position against the pressure of fluid in the inlet. Preferably, the microvalve is constructed out of SiC and stainless steel materials, allowing the microvalve to be used in a harsh environment.

15 Claims, 3 Drawing Sheets

MICROELECTROMECHANICAL HIGH PRESSURE GAS MICROVALVE

BACKGROUND OF THE INVENTION

1. Field of the Invention

This invention generally relates to microvalves, and more specifically, to microvalves that are well suited for use in harsh environments.

2. Background Art

There are a number of situations in which valves are subjected to harsh environments. One such application is in rocket engines, where valves are used to direct exhaust gases to help steer the rocket. These valves are subjected to very harsh conditions, and specifically, to very high temperatures and pressures and to highly corrosive gases. In addition to being subjected to these extremely difficult conditions, it is critical that the valves operate precisely in order to accurately steer the rocket. In order to achieve the necessary operating precision, these valves are machined very precisely. Because of this needed highly precise mechanical machining, the valves are very expensive.

It would be desirable if these prior art mechanically machined valves could be replaced with microelectromechanical valves where critical features of the valves could be made using photolithographic procedures, which can achieve very high precision at a lower cost than mechanical machining. In order to achieve this, however, the valves need to be designed so that they can operate in a harsh environment and so that critical features of the valves can, in fact, be made using photolithography procedures.

SUMMARY OF THE INVENTION

An object of the present invention is to provide a microvalve that is very well suited for use in harsh environments.

Another object of this invention is to provide a means of switching a flow of gas supplied at high pressures while being located in a harsh environment.

A further object of the invention is to provide a control mechanism for a microvalve that will effectively and reliably work in a hash environment to open and close the valve at preset pressure levels.

Still another object of this invention is to provide a microvalve having a combination of robustness against chemical corrosion, high temperature compatibility and high pressure control that makes the valve very well suited for harsh environments.

These and other objectives are attained with a microvalve comprising first and second layers, a diaphragm member and a switching means. The first and second layers are secured together to form a valve body that forms an inlet opening for receiving fluid, an outlet opening for conducting fluid from the valve body, and a flow channel for conducting fluid from the inlet to the outlet. The diaphragm is disposed between the layers, and is movable between open and closed positions. In the closed position, the diaphragm blocks the flow of fluid from the inlet to the flow channel; and in the open position, the diaphragm allows fluid flow from the inlet into said flow channel, allowing fluid flow from the inlet to the outlet of the microvalve. The diaphragm is biased to the closed position, and moves from the closed position to the open position when the pressure of fluid in the inlet reaches a preset value. The switching means is connected to the valve body for moving the diaphragm to the closed position against the pressure of fluid in the inlet.

Preferably, the microvalve is constructed out of SiC and stainless steel materials, allowing the microvalve to be used in a harsh environment. In particular, in the preferred embodiment, the two layers are each formed from ceramics such as Silicon Carbide (SiC) or Silicon (Si) material and are bonded together with a thin metallic diaphragm. The bottom layer has through holes that form the valve inlet and outlet, and the bottom layer also forms the flow channels for the fluid. Also, preferably, the valve inlet and outlet and the flow channel in between are formed using photolithography procedures and micro-electro-mechanical (MEMS) technologies such as laser etching and bulk mircomachining.

In addition, in the preferred embodiment, the switching means includes a boss and an actuation mechanism. The top layer contains the boss, which is adjacent to the diaphragm, and the actuation mechanism is used to push the boss to push the diaphragm against a seat extending around the inlet and thereby to close the valve. The actuation mechanism may be shape memory alloy, piezoelectric or other actuation method.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
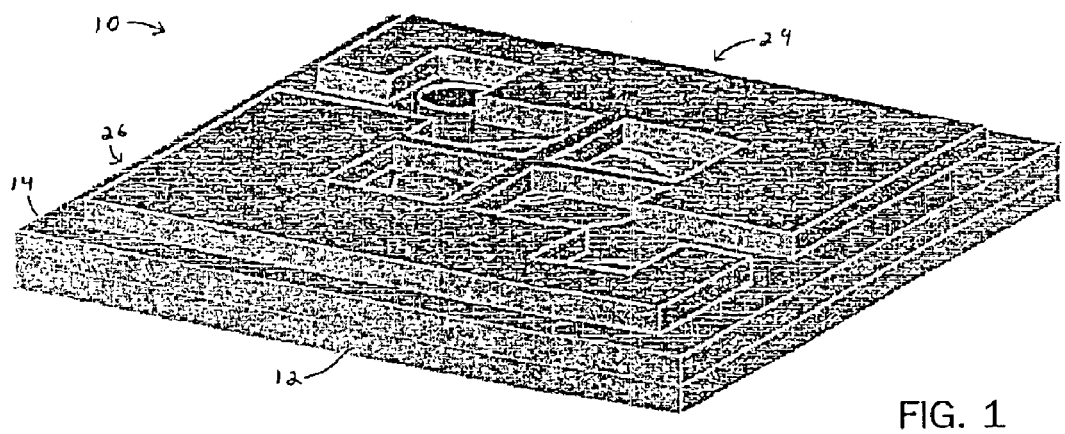
FIG. 1 is a perspective view of a microvalve embodying the present invention.
Figure 2:
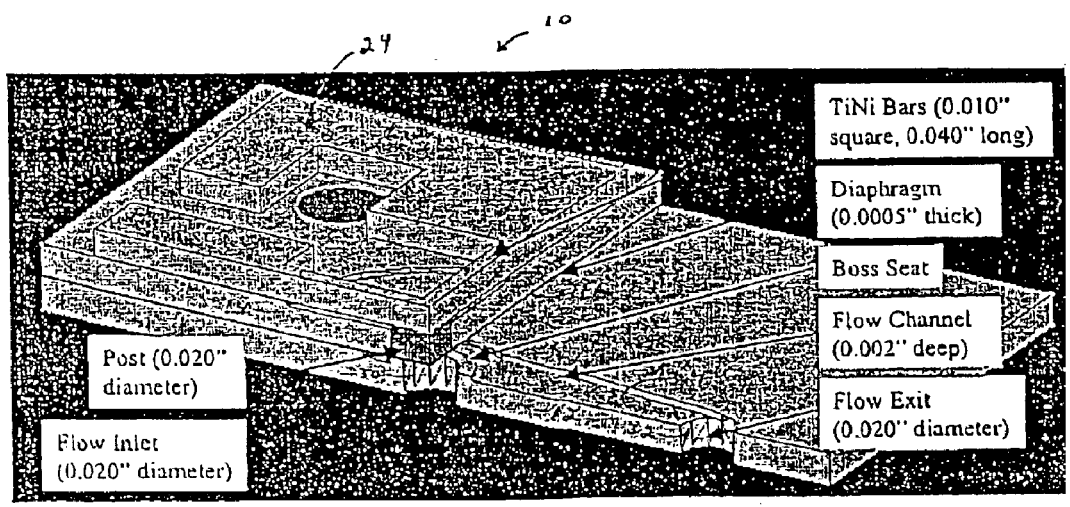
FIG. 2 is a partial cut away perspective view of the microvalve.
Figure 3:
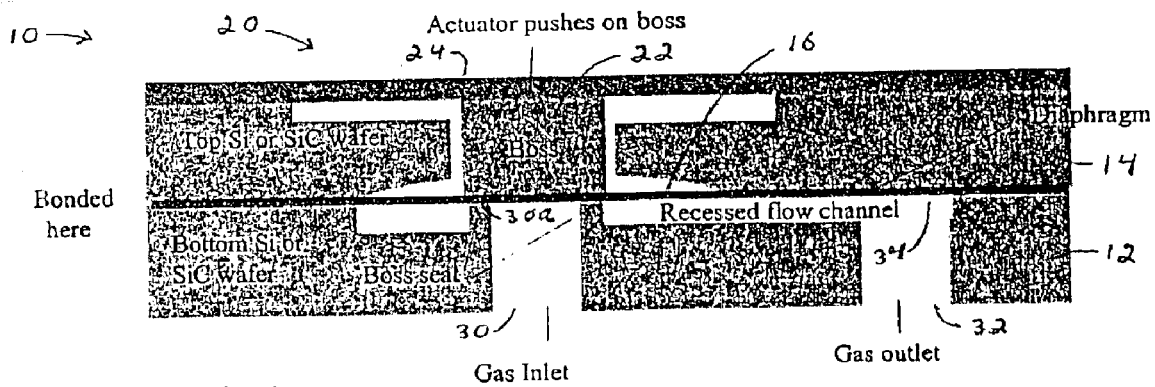
FIG. 3 is a cross-sectional view of the microvalve.
Figure 4:
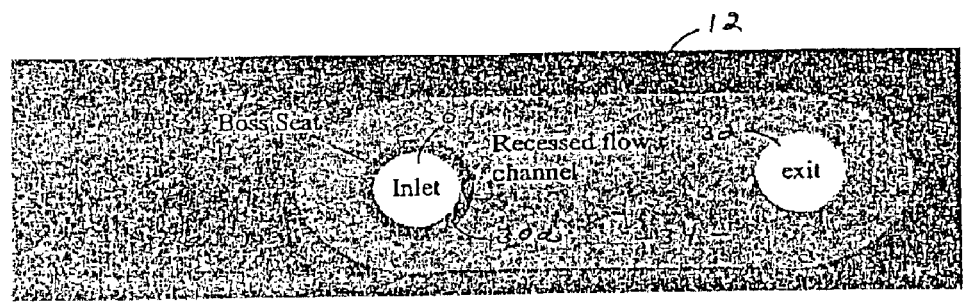
FIG. 4 is a top view of the bottom layer of the microvalve.

FIGS. 1–4 show a microvalve 10 generally comprising first and second layers 12 and 14, diaphragm member 16, and switching means 20. Switching means 20, in turn, includes boss 22 and actuation mechanism 24.

Generally, each of the layers 12 and 14 has a flat thin shape, and the layers are secured together to form a plate or valve body 26. This valve body forms an inlet opening 30 for receiving fluid, an outlet opening 32 for conducting fluid from the valve body, and a flow channel 34 for conducting fluid from the inlet to the outlet. The diaphragm 16 is disposed between the layers 12 and 14, and is moveable between open and closed positions. In the closed position, the diaphragm 16 blocks the flow of fluid from the inlet 30 to the flow channel 34; and in the open position, the diaphragm allows fluid flow from the inlet into that flow channel, allowing fluid flow from the inlet to the outlet 32 of the microvalve. The diaphragm 16 is biased to the closed position, and moves from the closed position to the open position when the pressure of fluid in the inlet 30 reaches a preset value. The switching means 20 is connected to the valve body 26 for moving the diaphragm 16 to the closed position against the pressure of fluid in the inlet 30.

In the preferred embodiment, the two layers 12 and 14 are each a ceramic metallic such as Silicon Carbide (SiC) or Silicon (Si) material and are bonded together with a thin metallic diaphragm 16. The bottom layer 12 has through holes that form the valve inlet 30 and outlet 32, and layer 12 forms the flow channels 34 for the fluid. Also, preferably, as mentioned above, the switching means 20 includes a boss 22 and an actuation mechanism 24. The top layer 14 contains the boss 22, which is adjacent to the diaphragm 16, and the actuation mechanism 24 is used to push the boss, which in turn pushes the diaphragm against a seat 30a extending around the inlet 30 and thereby to close the valve 10.

With the embodiment of the microvalve 10 shown in FIGS. 1–4, the actuation mechanism 24 is a shape memory alloy, such as a titanium-nickel alloy. Other actuation mechanisms may be used such as piezoelectric ceramics, electromagnetics or microsolenoids.

In use, when a high gas pressure is supplied to the bottom feed through hole 30, the diaphragm 16 and boss 22 are pushed away from the seat 30a. If a sufficient enough high pressure is supplied, the diaphragm 16 is moved away from the seat 30a, allowing the gas to flow over and around this seat. The gas then flows through channels 34, which preferably are etched in the bottom SiC or Si layer 12, and exits through another through hole 32. The pressure at which gas will flow can be chosen by suitable choices of the material and thickness for diaphragm 16 as well as the actuation mechanism 24. For instance, with the embodiment of the microvalve 10 illustrated in the drawings, the pressure at which the gas will flow, referred to as the cracking pressure, is approximately 800 psi. Other pressures, or pressure ranges, may be used, however, and for example, the valve 10 can be modified to open at pressures from 800–1200 psi. These pressures, it may be noted, make the valve well suited for high pressure gas operation.

When the actuation mechanism 24 is activated, the boss 22 is pushed down, closing the diaphragm 16 against the boss seat 30a and stopping the flow of gas. With the embodiment of microvalve 10 shown in FIGS. 1–4, in which the actuation mechanism 24 is a shape memory alloy, the actuator is activated by conducting an electric current through the alloy, resistively heating the material and causing a change in the material modulus. The shape memory bars, which are in contact with the boss 22, effectively become stiffer, pushing the boss back down against the boss seat 30a. As mentioned above, other types of actuators, such as piezoelectric ceramaics, microsolenoids, and electromagnets, may also be used in microvalve 10. Due to the design and construction, the actuation mechanism 24 is preferably located on the top surface of the top SiC or Si layer 14. This allows for easy implementation of a wide variety of actuation mechanisms 24. This location of the actuation mechanism 24 also helps to isolate that mechanism from the high temperature gas with which the valve 10 may be used.

Figure 5:
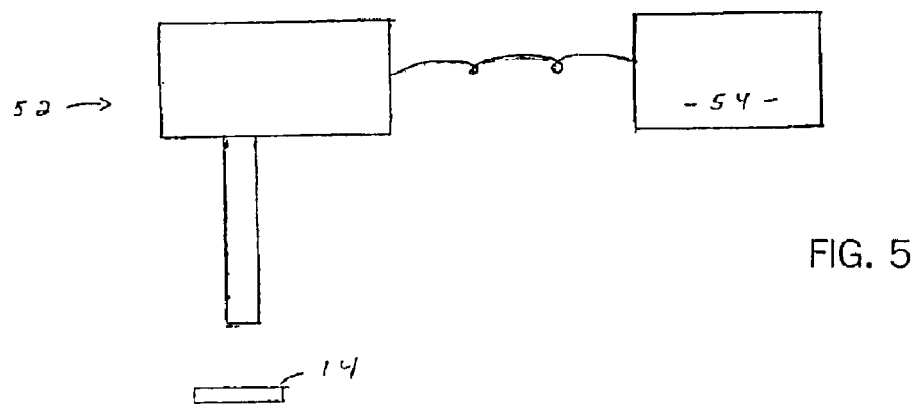
FIG. 5 illustrates a procedure for forming a valve stop in the microvalve.

A recess or cavity 50 in the valve body 26 is provided to allow the diaphragm 16, specifically the central portion thereof, to flex upward, away from valve seat 30a. With the preferred embodiment of microvalve 10, a sloped "dome" is ablated in the underside of the top SiC or Si wafer in order to provide a gentle valve stop. This extends valve life by reducing stress concentrations on the valve diaphragm 16. The smooth sloped edges of the recess provide a gentle stop and prevent rupturing the thin diaphragm of the valve. With reference to FIG. 5, a direct-write laser 52, controlled via a computer aided drawing program running on computer 54, may be used to form the desired three-dimensional contoured shapes in silicon carbide and silicon wafers. These materials absorb the laser energy sufficiently enough to be ablated in a relatively short period of time (it takes only a few minutes to pattern an entire wafer). Laser 52, for example, may be of the type that are currently designed for drilling holes through various dielectrics or conductors by ablating away material.

By adjusting several laser parameter settings, and applying the appropriate CAD input files, contoured shapes can be formed in the wafers. One suitable laser that may be used, for instance, is a tripled yag laser having a nominal spot size of twenty-five microns and a Gaussian power distribution. From these initial criteria, laser parameters such as travel velocity (i.e., plotting speed) and repetition rates are adjusted to define the laser's bite size (i.e., step). The repetition rate controls the amount of power (energy per pulse) delivered by the laser. Furthermore, parameters such as settling time, drill style, defocus, etc., all combine to define a laser "tool." Multiple tools can be defined for the laser in the same way that multiple tools are defined for photoplotters. By experimenting with different wafer materials, laser tool definitions, and CAD representations, a wide range of suitable three-dimensional contours can be achieved.

For example, CAD artwork files, comprising a set of concentric polygons approximating circles, may be generated to create the dome structure. The laser ablation depth can be controlled by modifying the offset step pitch of the polygons and equating certain line widths to an equivalent laser tool definition. Preferably, the laser tool definition is combined with the CAD artwork, which defines a laser path such that the resulting geometry has no sharp edges that could cause the diaphragm to tear or rupture.

Figure 6:
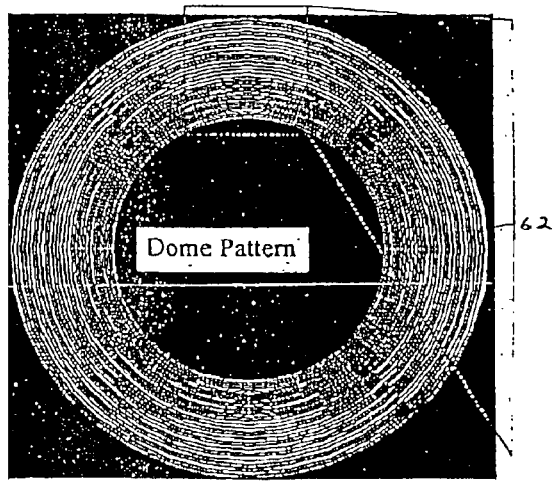
FIG. 6 shows the interior, dome pattern of the valve stop.
Figure 7:
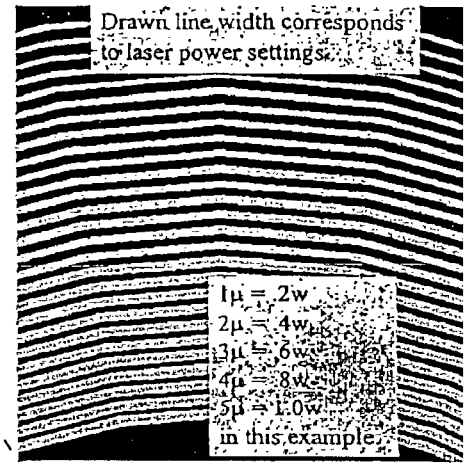
FIG. 7 is an enlarged view of a portion of FIG. 6.
Figure 8:
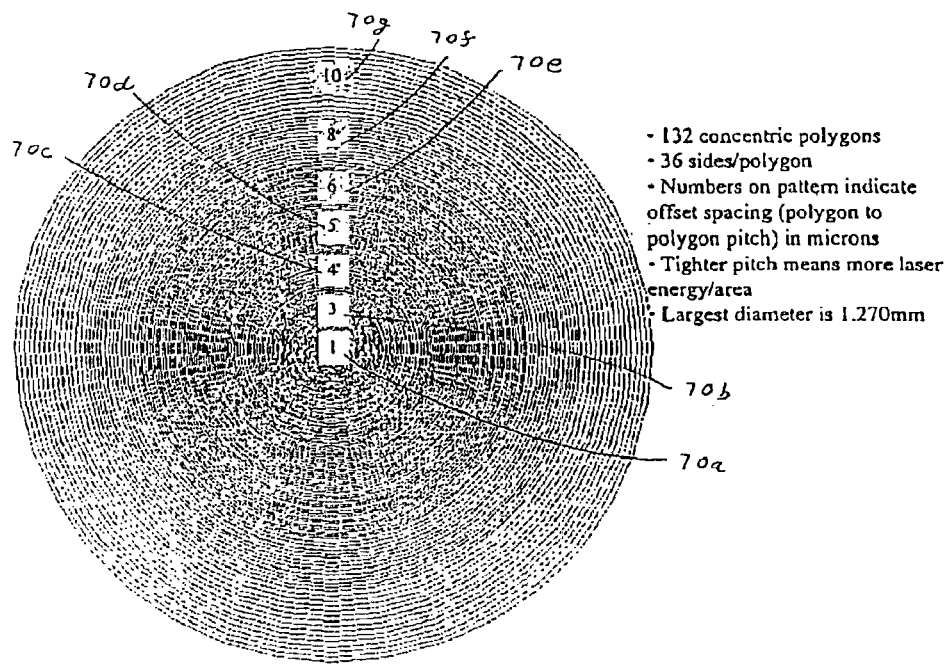
FIG. 8 illustrates an alternate dome pattern.

FIGS. 6–8 illustrate, as examples, specific patterns that may be used to form the dome-shaped recess. The pattern 60 shown in FIGS. 6 and 7 is comprised of a series of polygons 62. In this pattern, the spacing between lines is approximately constant, and the widths of the lines vary between 1 and 5 um. Other arrangements may be used, however, and for example, the pattern could be formed with approximately constant line widths, and the spacing between lines could vary. FIG. 8 illustrates an alternate pattern 70 comprised of one hundred thirty-two concentric, thirty-six sided polygons. These polygons are separated into seven radially adjacent groups 70a, 70b, 70c, 70d, 70e, 70f and 70g. The polygons in each group are equally spaced apart, and the spacing between adjacent polygons increases from group to group in the radially outward direction The above-described process for forming dome shaped recess 50 is easily controlled, repeatable, and much faster than etching approaches. The process is capable of creating features and shapes which cannot be created by standard reactive ion etching (RIE) processing. Also, the approach described above does not require creation of a hard photomask or gray scale mask.

Known MEMS fabrication processes may be used for the construction of the whole valve 10. This allows the possibility for low cost microvalves due to the economies of scale—many valves can be fabricated per substrate wafer. In addition, due to the inherent accuracy of these fabrication processes, such as lithography, microvalves can be produced with very precise features. In addition, preferably, the diaphragm material and thickness (choosing modulus and thickness to determine membrane "stiffness") and the actuation mechanism are chosen such that the microvalve can control very high pressure gas flows. The approximate pressure range of the current preferred embodiment is between 800–1200 psi.

As will be understood by those of ordinary skill in the art, the individual elements of microvalve 10 may have a wide range of specific dimensions. With one specific embodiment, for example, that has been actually reduced to practice, the shape memory alloy TiNi bars 24 are 0.010" square and 0.040" long, the diaphragm 16 is 0.0005" thick, and the boss 22 has a diameter of 0.020". Also, with this embodiment, the flow inlet 30 and the flow outlet 32 each have a diameter of 0.020", and the flow channel 34 is 0.002" deep. In addition, the dome shaped recess 50 has a diameter of 1.270 mm, the outer edge of the dome is flush with the wafer surface and the center of the dome is 0.025 mm high. This allows the valve diaphragm 16 to open and still provide a smooth surface to stop the back of the diaphragm and prevent rupturing up to at least 1200 psi pressure.

As will be understood, valve 10 may be changed in many ways without departing from the scope of the present invention. For example, with modifications within the ability of those of ordinary skill in the art, the functions of inlet 30 and outlet 32 may be reversed, so that fluid flows into valve 10 via opening 32 and exits the valve via opening 30. Also, any suitable material or materials may be used to form layers 12 and 14. As mentioned above, these layers 12 and 14 may be made from a ceramic, and these layers may also be made from a metal alloy such as stainless steel.

The preferred embodiment of the invention, as described above in detail, provides a number of important advantages. For instance, microvalve 10 is very well suited for use in applications where high temperatures or corrosive conditions exist. SiC is a very robust material against chemical corrosion. At the present time, there are no known chemical that will etch SiC at a rate greater than 100 Angstroms/min. Therefore, a microvalve constructed or manufactured from SiC will resist potentially corrosive chemicals in the environment. Further, microvalve 10 can control a very high pressure gas feed due to the mechanical design as well as the force capabilities of the actuation mechanism. The combination of robustness against chemical corrosion, high temperature compatibility, and high pressure control makes microvalve 10 ideally suited for harsh environments. These may include such applications as aircraft engines, power turbines, or missile systems.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A microvalve comprising:
   first and second layers secured together to form a valve body, the valve body forming an inlet opening for receiving fluid, an outlet opening for conducting the fluid from the valve body, and a flow channel for conducting the fluid from the inlet to the outlet;
   a diaphragm member disposed between said first and second layers and moveable between closed and open positions, wherein in the closed position, the diaphragm blocks the flow of fluid from the inlet to the flow channel; and in the open position, the diaphragm allows fluid flow from the inlet into said flow channel to allow fluid flow from the inlet to the outlet; and wherein the diaphragm is biased to the closed position and moves from the closed position to the open position when the pressure of fluid in the inlet reaches a preset value; and
   an actuator mechanism connected to the valve body for moving the diaphragm to the closed position against the pressure of fluid in the inlet;
   whereby the diaphragm has first and second closed states;
   the diaphragm is in the first closed state when the pressure of fluid in the inlet is below the preset value;
   the diaphragm is in the second closed state when the actuator mechanism is actuated to move the diaphragm to the closed position; and
   in both of the first and second closed states, the diaphragm blocks the flow of fluid from the inlet to the flow channel.

2. A microvalve according to claim 1, wherein the first and second layers are made from Silicon Carbon or Silicon.

3. A microvalve according to claim 1, wherein:
   the first layer forms an upper seat extending around an upper end of the inlet opening;
   in the closed position, the diaphragm seats against said upper seat to close the upper end of the inlet opening and thereby prevent fluid flow from the inlet to the flow channel; and
   in the open position, the diaphragm is spaced from the upper seat to allow fluid flow from the inlet into the flow channel.

4. A microvalve comprising:
   first and second layers secured together to form a valve body, the valve body forming an inlet opening for receiving fluid, an outlet opening for conducting the fluid from the valve body, and a flow channel for conducting the fluid from the inlet to the outlet;
   a diaphragm member disposed between said first and second layers and moveable between closed and open positions, wherein in the closed position, the diaphragm blocks the flow of fluid from the inlet to the flow channel, and in the open position, the diaphragm allows fluid flow from the inlet into said flow channel to allow fluid flow from the inlet to the outlet; and wherein the diaphragm is biased to the closed position and moves from the closed position to the open position when the pressure of fluid in the inlet reaches a preset value; and
   an actuator mechanism connected to the valve body for moving the diaphragm to the closed position against the pressure of fluid in the inlet;
   wherein the actuator includes:
   a boss supported for reciprocating movement to push the diaphragm against an upper seat; and
   an actuator connected to the valve body to move the boss toward the first layer and thereby to push the diaphragm against the upper seat and into the closed position.

5. A microvalve according to claim 4, wherein the actuator includes:
   a shape memory alloy having first and second shapes; and
   means to change the memory alloy between the first and second shapes; and
   wherein, when the memory alloy changes from the first shape to the second shape, the memory alloy pushes the boss against the diaphragm and the boss pushes the diaphragm into the closed position.

6. A microvalve according to claim 4, wherein:
   the second layer forms a top surface and a through opening above the diaphragm;
   the boss is located in said through opening;
   the actuator is secured to the top surface of the second layer and engages the boss to selectively move the boss downward.

7. A microvalve according to claim 3, wherein:

the first layer defines a top surface;

the upper seat of the first layer is substantially coplanar with said top surface; and the flow channel is comprised of a recess in the first the layer, extending downward from said top surface.

8. A method of forming a microvalve, comprising the steps of: providing first and second layers;

connecting the first and second layers together to form a valve body, said valve body forming a fluid inlet, a fluid outlet, and a flow channel, between the inlet and outlet, to conduct fluid from the inlet to the outlet;

capturing a diaphragm between the first and second layers, wherein the diaphragm is movable between open and closed positions, in the closed position, the diaphragm blocks the flow of fluid from the inlet to the flow channel; and in the open position, the diaphragm allows fluid flow from the inlet into said flow channel to allow fluid flow from the inlet to the outlet;

biasing the diaphragm toward the closed position, and wherein the diaphragm moves from the closed position to the open position when the pressure of fluid in the inlet reaches a preset value; and providing an actuator mechanism to engage and move the diaphragm to the closed position against the pressure of fluid in the inlet;

whereby the diaphragm has first and second closed states;

the diaphragm is in the first closed state when the pressure of fluid in the inlet is below the preset value;

the diaphragm is in the second closed state when the actuator mechanism is actuated to move the diaphragm to the closed position; and in both of the first and second closed states, the diaphragm blocks the flow of fluid from the inlet to the flow channel.

9. A method according to claim 8, wherein:

the first layer is made from a ceramic material; and further comprising the step of etching a groove in the first layer, said groove becoming said flow channel when said first and second layers are connected together.

10. A method according to claim 9, wherein the etching step includes the step of using a chemical etching process to form said groove.

11. A method according to claim 8, wherein:

the first layer is made from a metal alloy; and further comprising the step of etching a groove in the first layer, said grove becoming said flow channel when said first and second layers are connected together.

12. A method according to claim 8, wherein:

the connecting step includes the steps of:

forming the inlet with a top seat extending around a top end of the inlet; and extending the flow channel outward away from the seat; and when the diaphragm is in the closed position, the diaphragm seats against said seat to close the upper end of the inlet and thereby prevents fluid flow from the inlet to the flow channel; and when the diaphragm is in the open position, the diaphragm is spaced from the upper seat to allow fluid flow from the inlet into the flow channel.

13. A method of forming a microvalve, comprising the steps of:

providing first and second layers;

connecting the first and second layers together to form a valve body said valve body forming a fluid inlet, a fluid outlet, and a flow channel between the inlet and outlet, to conduct fluid from the inlet to the outlet;

capturing a diaphragm between the first and second layers, wherein the diaphragm is movable between open and closed positions, in the closed position, the diaphragm blocks the flow of fluid from the inlet to the flow channel; and in the open position, the diaphragm allows fluid flow from the inlet into said flow channel to allow fluid flow from the inlet to the outlet;

biasing the diaphragm toward the closed position, and wherein the diaphragm moves from the closed position to the open position when the pressure of fluid in the inlet reaches a preset value; and providing an actuator mechanism to engage and move the diaphragm to the closed position against the pressure of fluid in the inlet;

wherein the step of providing an actuator mechanism includes the steps of:

positioning a boss adjacent the diaphragm to push the diaphragm against a; and providing an actuator to move the boss toward the first layer thereby to push the diaphragm against said seat and into the closed position.

14. A method according to claim 13, wherein:

the second layer forms a through opening above the diaphragm;

the step of positioning the boss includes the step of locating the boss in said through opening; and the step of providing an actuator mechanism includes the step of securing the actuator to the second layer with the actuator engaging said boss.

15. A method according to claim 8, wherein:

the actuator mechanism includes a shaped memory alloy; and the step of providing the actuator mechanism includes the step of connecting the shaped memory alloy to an electric current source to selectively heat the memory alloy to expand the shape of the memory alloy.

* * * * *